United States Patent
Marathe (10) Patent No.: US 8,434,300 B2
(45) Date of Patent: May 7, 2013

(54) TORQUE CONVERTER BLADE

(75) Inventor: Bhaskar Marathe, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1078 days.

(21) Appl. No.: 12/411,061

(22) Filed: Mar. 25, 2009

(65) Prior Publication Data

US 2009/0241533 A1    Oct. 1, 2009

Related U.S. Application Data

(60) Provisional application No. 61/070,995, filed on Mar. 27, 2008.

(51) Int. Cl.
*F16D 33/20*    (2006.01)

(52) U.S. Cl.
USPC ............................. 60/366; 60/330

(58) Field of Classification Search .......... 60/330, 60/366, 367
See application file for complete search history.

(56) References Cited

U.S. PATENT DOCUMENTS

| | | | |
|---|---|---|---|
| 2,660,957 A | 12/1953 | Koskinen | |
| 3,673,659 A | 7/1972 | Ishii et al. | |
| 3,817,656 A | 6/1974 | Batteau | |
| 5,706,656 A * | 1/1998 | Hinkel | 60/330 |
| 5,794,436 A | 8/1998 | Maeda | |
| 5,893,704 A | 4/1999 | Prater | |
| 7,958,724 B2 * | 6/2011 | Wiegert | 60/366 |

* cited by examiner

*Primary Examiner* — F. Daniel Lopez
(74) *Attorney, Agent, or Firm* — Simpson & Simpson, PLLC (57) ABSTRACT

A blade for a torque converter including a body having an outer edge, at least two shell tabs integral to the outer edge and extending therefrom and at least one flexible sealing flange adjacent to at least one of the at least two shell tabs, the at least one flexible sealing flange is integral to the outer edge and extending therefrom, wherein the outer edge is arranged to conform to an inner surface of a shell in a torque converter, the shell having at least two slots arranged therethrough, the at least one flexible sealing flange is arranged to conform to the inner surface of the shell to provide a fluid seal, the at least two shell tabs are disposed through the at least two slots and at least one of the at least two shell tabs is arranged to engage an outer surface of the shell.

26 Claims, 9 Drawing Sheets

TORQUE CONVERTER BLADE

CROSS-REFERENCE TO RELATED APPLICATIONS

This patent application claims the benefit under 35 U.S.C. §119(e) of U.S. Provisional Application No. 61/070,995, filed Mar. 27, 2008, which application is incorporated herein by reference.

FIELD OF THE INVENTION

The invention broadly relates to torque converters, more specifically to a torque converter blade, and even more particularly to a torque converter blade which provides a fluid seal without brazing or other bonding operations.

BACKGROUND OF THE INVENTION

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, typically includes three primary components: an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

Although assembling blades within a torque converter housing, at first glance, may appear trivial, manufacturing constraints and requirements make the task quite difficult. A shell is formed, e.g., typically by stamping, slots are coined into or punched through the shell, and subsequently blades are positioned within the slots in the shell. Traditionally, the blades have been connected to their respective shell by means of welding. It is to be understood that "welding" in this sense is to be broadly construed. "Welding" is intended to include the following:

Direct fusion of the blades to the shell of the turbine by melting and subsequently hardening at their interface;
Connection by means of an intermediate or connecting molten metal as occurs in gas or arc welding using a metal connecting material usually selected from copper, iron and alloys of at least two of iron, copper, tin, zinc, lead, aluminum, silver, cobalt, chromium and nickel, an example of this method is described in U.S. Pat. No. 3,673,659; and,
Connection using plastic material that is usually a cross linked organic plastic such as an epoxy resin, e.g., as described in U.S. Pat. No. 3,817,656.

The most common form of welding utilized in constructing torque converters has been brazing.

It has been suggested that blades might be secured without welding by utilizing mechanical fastening such as tabs on a blade that are inserted into slots or recesses in a turbine shell. Unfortunately, such devices have had serious disadvantages.

A major disadvantage has been that the blade is not held as securely as when welding is used and the blade may thus vibrate to cause noise, part wear and eventual catastrophic failure. Examples of such devices are described in U.S. Pat. Nos. 2,660,957; 3,673,659; and, 5,794,436.

A further major disadvantage has been that there has been an inability, by such mechanical fastening, to obtain a tight fit of the blade with the turbine shell. This results in significant inefficiency since fluid within the turbine can pass between the blade and the turbine body thus failing to direct the kinetic energy in that fluid to the turbine and thereby the input shaft of the transmission. Examples of such devices are described in U.S. Pat. Nos. 2,660,957; 3,673,659; 5,794,436; and, 5,893,704.

Yet another disadvantage is that the mechanical method of attachment may be difficult, complex or time consuming, e.g., rivets or similar connectors are required or the blades and shells are of complex shapes that are difficult or expensive to manufacture and may require complex interlocking arrangements. Examples of such devices are disclosed in U.S. Pat. Nos. 2,660,957; 3,673,659; and, 5,794,436.

U.S. Pat. No. 5,893,704 describes a structure wherein tabs on the blades are described that fit within recesses in the shell of a turbine. An advantage resulting from this structure is that fluid flow between the blades and the shell is restricted thus increasing efficiency. Unfortunately, the increased efficiency is not as great as desired because fluid flow around the blade is only stopped at the location of the tab and fluid can still flow around the vane at other locations because the tab, as a practical matter, cannot be expected to hold the rest of the edge of the blade tightly against the body. This is true at least due to variations in insertable distance of the tab and variations in curvature of the body relative to curvature of the blade. A further serious disadvantage of this structure is that there is no positive holding force applied to the blade since the tab does not pass through the shell of the turbine but merely rests within a depression by friction.

All of the United States Patents described above are incorporated by reference herein as background art.

As can be derived from the variety of devices and methods directed at assembling a torque converter, many means have been contemplated to accomplish the desired end, i.e., retention of a blade within a shell, without the need for expensive welding operations, and thus resulting in lower assembly cost and complexity. Heretofore, tradeoffs between welding techniques and expense for such methods and steps were required. Thus, there has been a long felt need for a torque converter shell having a blade affixed without welding operations, while introducing minimal changes to the overall process of assembly, and maintaining an acceptable level of fluid sealing between the blade and the shell.

BRIEF SUMMARY OF THE INVENTION

In accordance with the present invention, a torque converter structure is provided wherein a plurality of high efficiency weld free connections between at least one of the impeller and its blades and the turbine and its blades that overcomes or reduces the disadvantages associated with prior torque converters as described in the BACKGROUND OF THE INVENTION above.

The present invention broadly comprises a blade for a torque converter including a body having an outer edge, at least two shell tabs integral to the outer edge and extending therefrom and at least one flexible sealing flange adjacent to at least one of the at least two shell tabs, the at least one flexible sealing flange is integral to the outer edge and extending therefrom. In this embodiment, the outer edge is arranged to conform to an inner surface of a shell in the torque converter. Moreover, the shell includes at least two slots arranged therethrough and the at least one flexible sealing flange is arranged to conform to the inner surface of the shell to provide a fluid seal, while the at least two shell tabs are disposed through the at least two slots and at least one of the at least two shell tabs is arranged to engage an outer surface of the shell. In some embodiments, the at least one flexible sealing flange is elevated relative to the at least two shell tabs, while in other embodiments, the at least one flexible sealing flange is disposed between the at least two shell tabs. In other embodiments, the at least one flexible sealing flange includes a first thickness and each of the at least two shell tabs includes a second thickness greater than the first thickness. In still other embodiments, each of the at least two slots has a depth and at least one of the at least two shell tabs has a length greater than the depth of at least one of the at least two slots. In yet further embodiments, the body further includes an inner edge having at least one core tab arranged to engage a core ring, while in still yet further embodiments, the shell is a turbine shell or a pump shell.

In a further embodiment, the present invention broadly comprises a torque converter including a shell having inner and outer surfaces and at least two slots arranged therethrough and a blade having a body including an outer edge arranged to conform to the inner surface of the shell, at least two shell tabs integral to the outer edge and extending therefrom and at least one flexible sealing flange adjacent to at least one of the at least two shell tabs. In this embodiment, the at least one flexible sealing flange is integral to the outer edge and extending therefrom. Moreover, the at least one flexible sealing flange is arranged to conform to the inner surface of the shell to provide a fluid seal, the at least two shell tabs are disposed through the at least two slots and at least one of the at least two shell tabs is arranged to engage the outer surface of the shell. In some embodiments, the at least one flexible sealing flange is elevated relative to the at least two shell tabs, while in other embodiments, the at least one flexible sealing flange is disposed between the at least two shell tabs. In other embodiments, the at least one flexible sealing flange includes a first thickness and each of the at least two shell tabs includes a second thickness greater than the first thickness. In still other embodiments, each of the at least two slots has a depth and at least one of the at least two shell tabs has a length greater than the depth of at least one of the at least two slots. In yet further embodiments, the body further includes an inner edge having at least one core tab arranged to engage a core ring, while in still yet further embodiments, the shell is a turbine shell or a pump shell.

In another embodiment, the present invention broadly comprises a torque converter including a shell having inner and outer surfaces and at least two slots arranged therethrough. In this embodiment, the present invention torque converter further includes a blade having a body including an outer edge, at least two shell tabs integral to the outer edge and extending therefrom and at least one flexible sealing flange adjacent to at least one of the at least two shell tabs. Moreover, the at least one flexible sealing flange is integral to the outer edge and extending therefrom and the outer edge and the at least one flexible sealing flange are arranged to conform to the inner surface of the shell. Additionally, in this embodiment, the present invention torque converter yet further includes a fluid seal having at least one interface between the inner surface of the shell and the at least one flexible sealing flange, wherein the at least two shell tabs are disposed through the at least two slots and at least one of the at least two shell tabs is arranged to engage the outer surface of the shell. In some embodiments, the at least one flexible sealing flange is elevated relative to the at least two shell tabs, while in other embodiments, the at least one flexible sealing flange is disposed between the at least two shell tabs. In other embodiments, the at least one flexible sealing flange includes a first thickness and each of the at least two shell tabs includes a second thickness greater than the first thickness. In still other embodiments, each of the at least two slots has a depth and at least one of the at least two shell tabs has a length greater than the depth of at least one of the at least two slots. In yet further embodiments, the body further includes an inner edge having at least one core tab arranged to engage a core ring, while in still yet further embodiments, the shell is a turbine shell or a pump shell.

In still yet a further embodiment, the present invention broadly comprises a method of assembling a blade in a torque converter shell, the shell including inner and outer surfaces and at least two slots arranged therethrough and the blade including a body having an outer edge arranged to conform to the inner surface of the shell, at least two shell tabs integral to the outer edge and extending therefrom and at least one flexible sealing flange adjacent to at least one of the at least two shell tabs. Moreover, the at least one flexible sealing flange is integral to the outer edge and extending therefrom and the at least one flexible sealing flange is arranged to conform to the inner surface of the shell. The present invention method comprises the steps of: a) inserting the at least two tabs through the at least two slots; b) bending at least one of the at least two tabs to engage the outer surface; and, c) retaining the at least one flexible sealing flange against the inner surface of the shell. In other embodiments, the method further includes the step of: d) providing a fluid seal between the at least one flexible sealing flange and the inner surface of the shell. In some embodiments, the at least one flexible sealing flange is elevated relative to the at least two shell tabs, while in other embodiments, the at least one flexible sealing flange is disposed between the at least two shell tabs. In other embodiments, the at least one flexible sealing flange includes a first thickness and each of the at least two shell tabs includes a second thickness greater than the first thickness. In still other embodiments, each of the at least two slots has a depth and at least one of the at least two shell tabs has a length greater than the depth of at least one of the at least two slots. In yet further embodiments, the body further includes an inner edge having at least one core tab arranged to engage a core ring, while in still yet further embodiments, the shell is a turbine shell or a pump shell.

It is a general object of the present invention to provide a fluid seal between a blade and a torque converter shell without forming a weld therebetween.

It is another general object of the present invention to simplify the process of assembling a torque converter shell having a plurality of blades disposed therein.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed embodiments.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "blades" is synonymous with the term such as "vanes," such terms may be used interchangeably as appearing in the specification and claims, and mean structures protruding from the shells of the pump and turbine having surfaces that in the case of the impeller, expel fluid or, in the case of the turbine, surfaces that receive the force of fluid expelled from the pump to rotate the turbine. It should also be appreciated that the term "fluid seal," as used in the specification and the claims, means either no fluid or a small amount of fluid may pass by or through the seal. In other words, "fluid seal" is not used exclusively to describe a complete seal, but also to describe a nearly complete seal. Although any methods, devices or materials similar or equivalent to those described herein can be used in the practice or testing of the invention, the preferred methods, devices, and materials are now described.

The invention is a torque converter having a plurality of high efficiency weld free connections between at least one of the impeller and its blades and the turbine and its blades that overcomes or reduces the disadvantages associated with the prior torque converters as described in the BACKGROUND OF THE INVENTION above. In particular, the torque converter of the invention does not require welding of blades to the shells of the impeller and/or the turbine. The blades are held securely so as to reduce or eliminate vibration, noise and catastrophic failure. Gaps between the blades and the shells are largely blocked to greatly reduce fluid by-pass, i.e., fluid leaking between blade and shell, thus increasing efficiency. Additionally, the parts are simple to manufacture and assemble.

Figure 1:
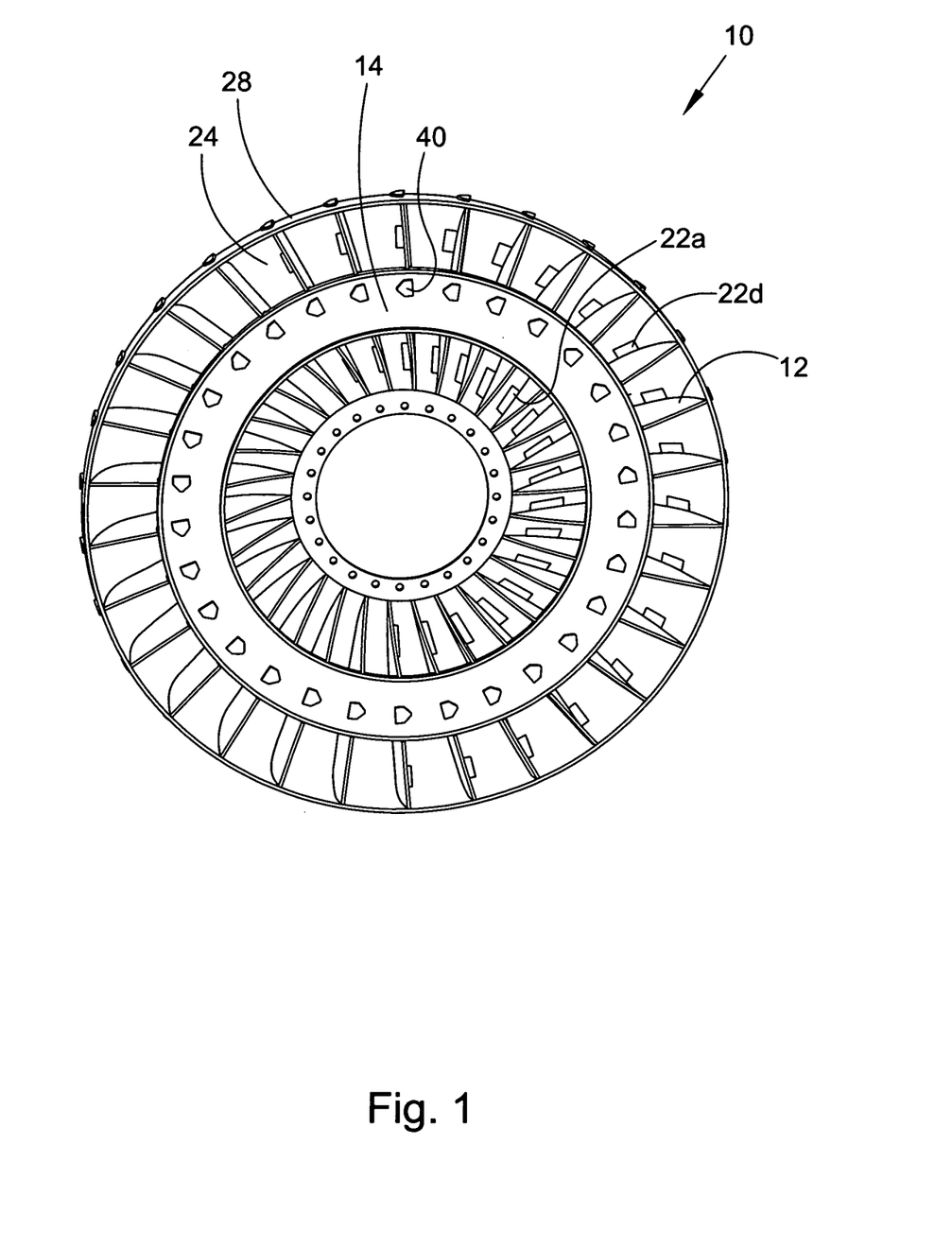
FIG. 1 is a perspective view of a torque converter shell having a plurality of an embodiment of present invention torque converter blades arranged therein.
Figure 2:
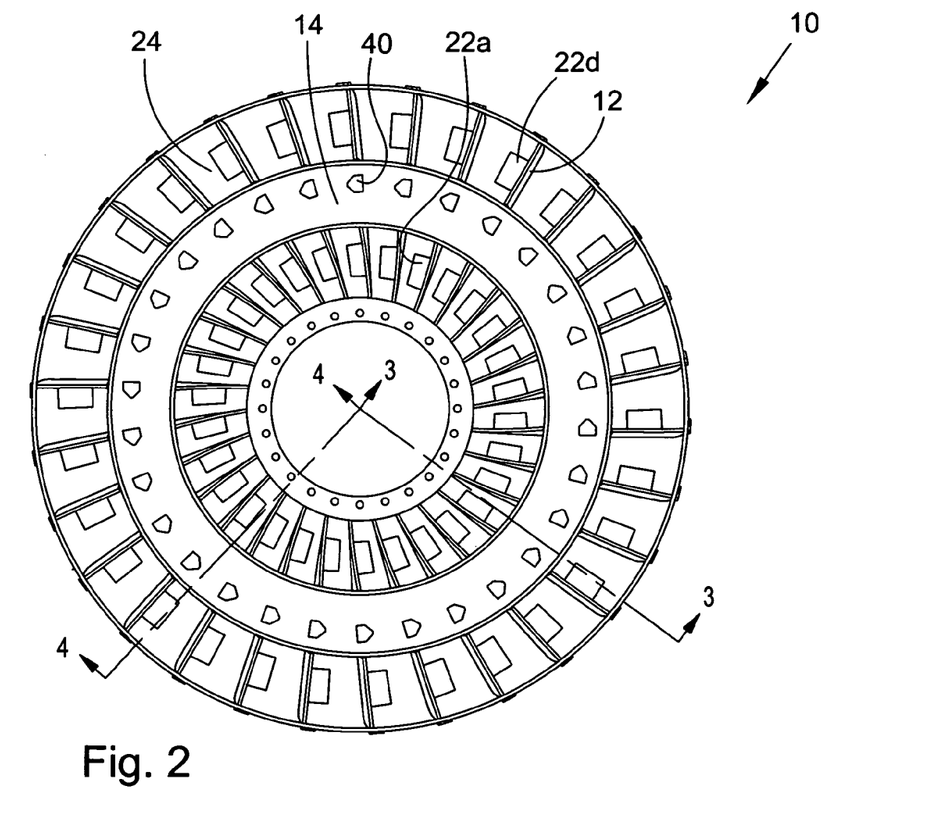
FIG. 2 is a top plan view of the torque converter shell of FIG. 1.
Figure 3:
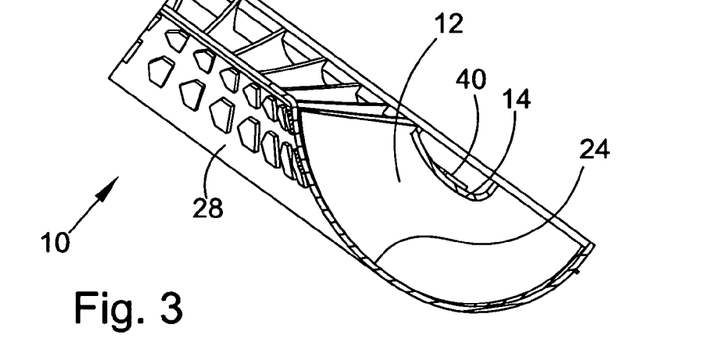
FIG. 3 is a cross sectional view of the torque converter shell of FIG. 1 taken generally along line 3-3 of FIG. 2.
Figure 4:
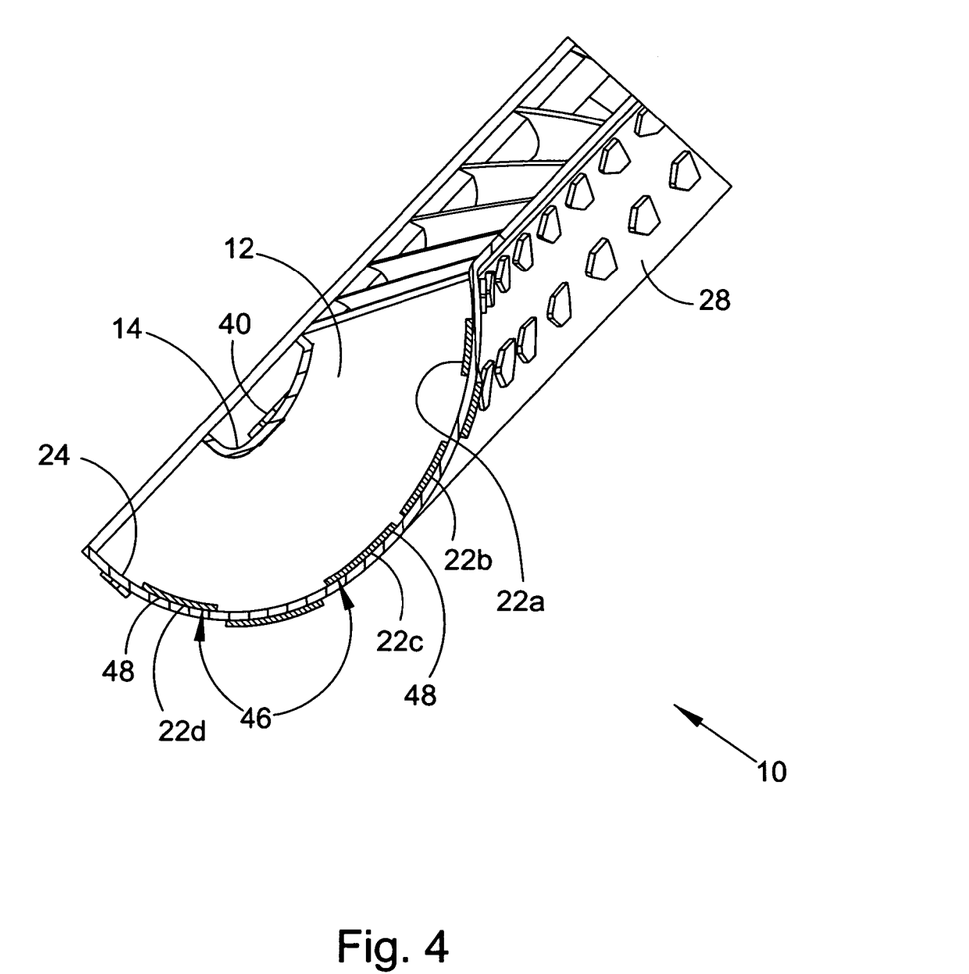
FIG. 4 is a cross sectional view of the torque converter shell of FIG. 1 taken generally along line 4-4 of FIG. 2.
Figure 5:
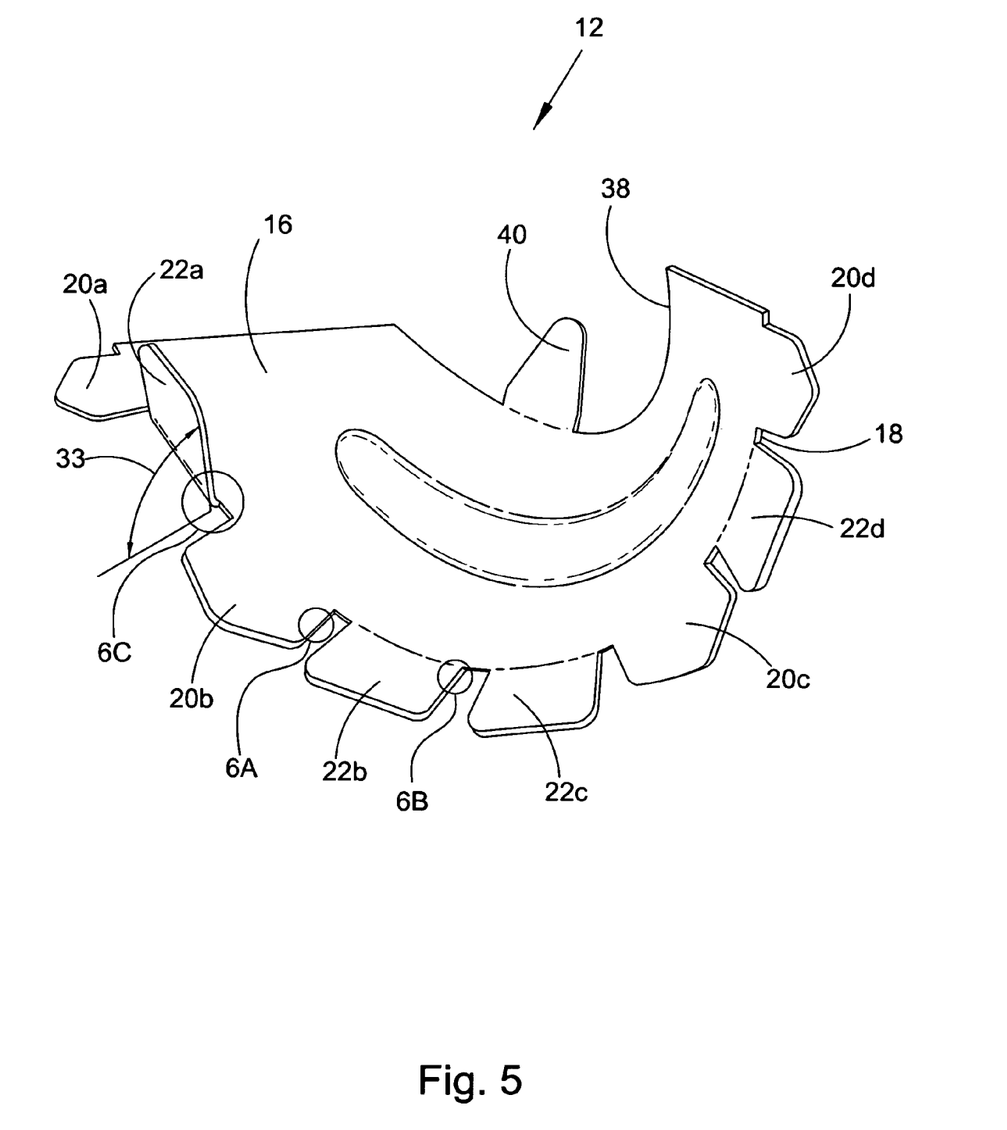
FIG. 5 is a perspective view of an embodiment of a present invention torque converter blade.
Figures 6A, 6B, 6C:
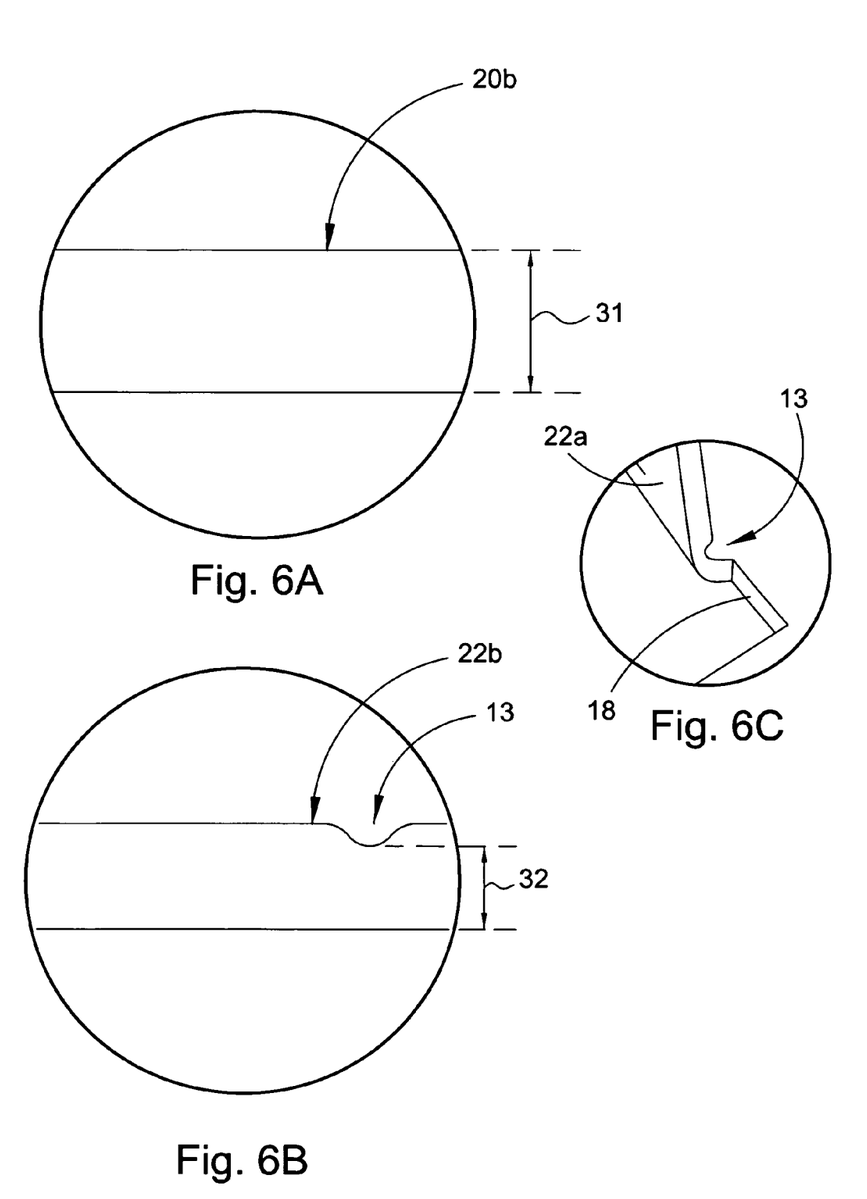
FIG. 6A is a side elevational view of the encircled region 6A of FIG. 5.
FIG. 6B is a side elevational view of the encircled region 6B of FIG. 5.
FIG. 6C is a partial perspective view of the encircled region 6C of FIG. 5.
Figure 7A:
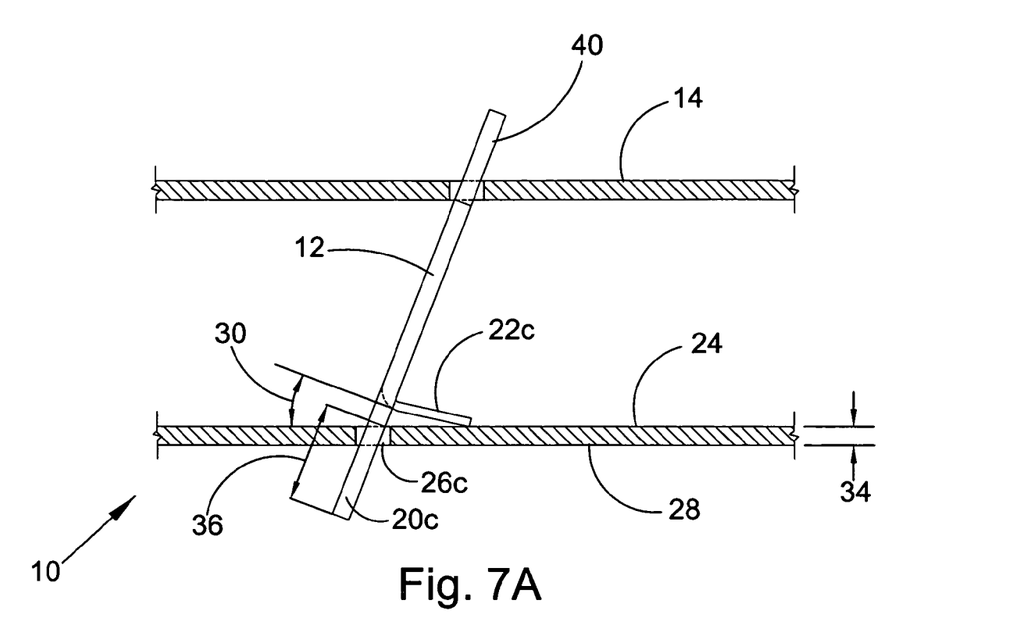
FIG. 7A is a cross sectional view of an embodiment of a present invention torque converter blade prior to securing the blade within a torque converter shell and a core ring.
Figure 7B:
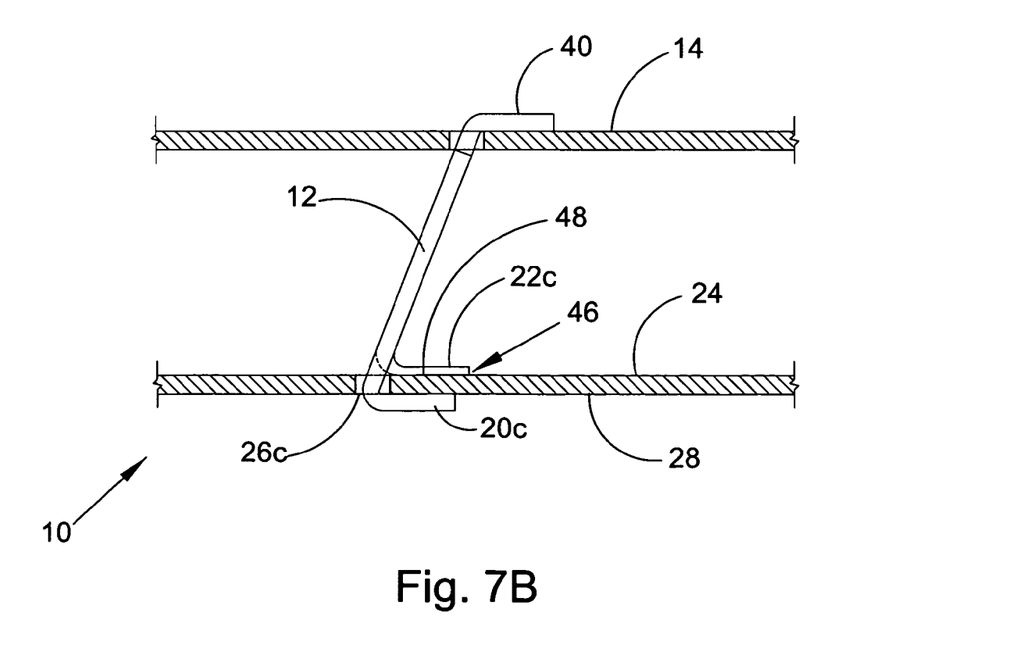
FIG. 7B is a cross sectional view of an embodiment of a present invention torque converter blade after securing the blade within a torque converter shell and a core ring.
Figure 8:
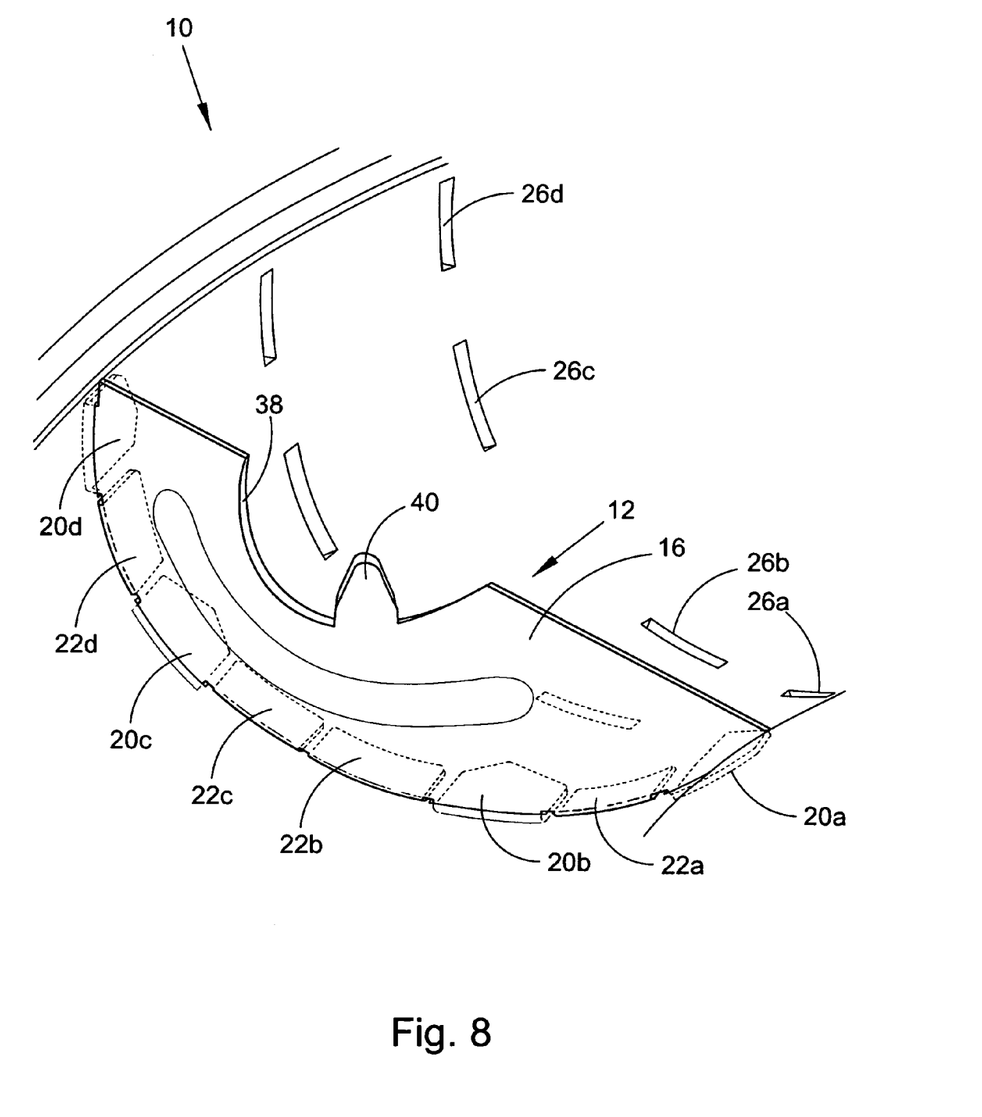
FIG. 8 is a partial perspective view of a torque converter shell having an embodiment of a present invention torque converter blade arranged therein.
Figure 9:
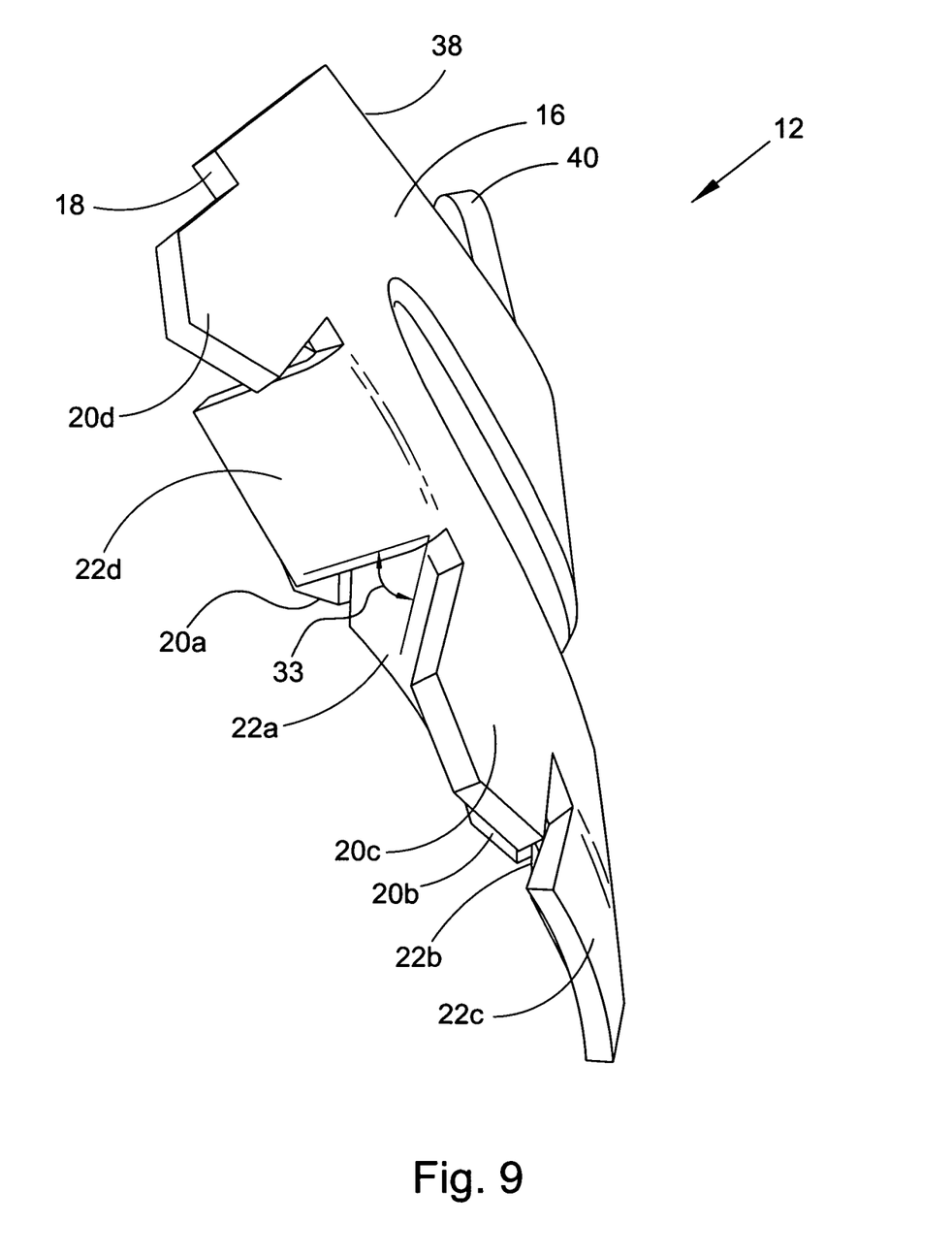
FIG. 9 is a back elevational view of an embodiment of a present invention torque converter blade; and, FIG. 10 is cross sectional view of a torque converter including a plurality of present invention torque converter blades arranged therein.
Figure 10:
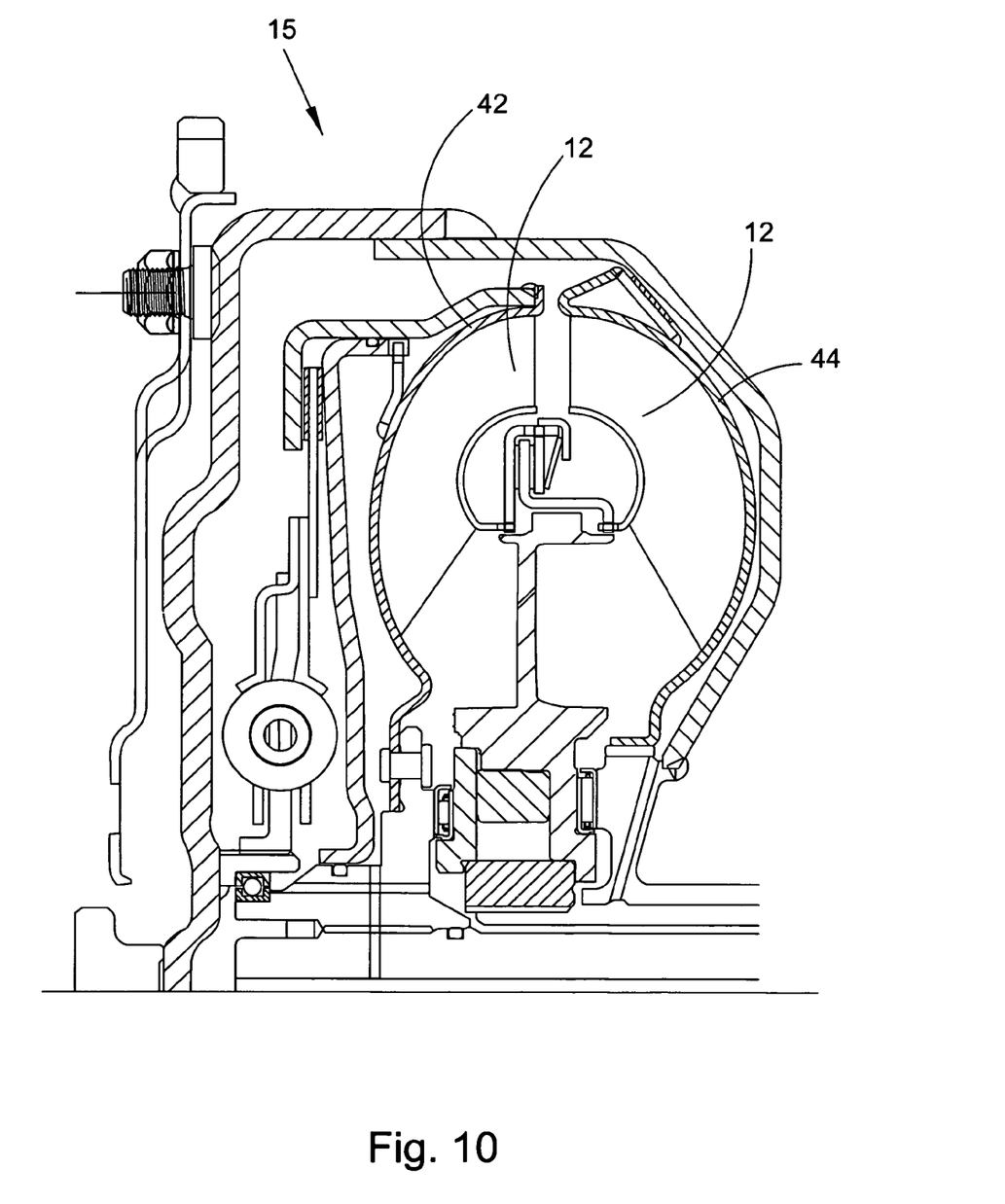

Adverting now to the figures, FIG. 1 shows a perspective view of torque converter shell 10 having a plurality of an embodiment of present invention torque converter blades arranged therein, i.e., torque converter blades 12, while FIG. 2 shows a top plan view of torque converter shell 10. FIG. 3 shows a cross sectional view of torque converter shell 10 taken generally along line 3-3 of FIG. 2, while FIG. 4 shows a cross sectional view of torque converter shell 10 taken generally along line 4-4 of FIG. 2. FIG. 5 shows a perspective view of an embodiment of a present invention torque converter blade, i.e., torque converter blade 12. FIG. 6A shows a side elevational view of the encircled region 6A of FIG. 5, i.e., a portion of a present invention torque converter blade 12, while FIG. 6B shows a side elevational view of the encircled region 6B of FIG. 5, i.e., another portion of a present invention torque converter blade 12 showing coined region 13, and FIG. 6C shows a partial perspective view of the encircled region 6C of FIG. 5, i.e., another portion of a present invention torque converter blade 12 showing coined region 13. FIG. 7A shows a cross sectional view of an embodiment of a present invention torque converter blade, i.e., torque converter blade 12, prior to securing the blade within torque converter shell 10 and core ring 14, while FIG. 7B shows a cross sectional view of torque converter blade 12 after securing the blade within torque converter shell 10 and core ring 14. FIG. 8 shows a partial perspective view of torque converter shell 10 having an embodiment of a present invention torque converter blade, i.e., torque converter blade 12, arranged therein. FIG. 9 shows a back elevational view of an embodiment of a present invention torque converter blade, i.e., torque converter blade 12. FIG. 10 shows a cross sectional view of torque converter 15 having torque converter blades 12 included therein. The following discussion is best understood in view of FIGS. 1 through 10.

The present invention broadly comprises a blade for a torque converter, e.g., torque converter blade 12. Torque converter blade 12 comprises body 16 having outer edge 18, shell tabs 20a, 20b, 20c and 20d integral to outer edge 18 and extending therefrom, and flexible sealing flanges 22a, 22b, 22c and 22d adjacent to shell tabs 20a, 20b, 20c and 20d, and also integral to outer edge 18 and extending therefrom. It should be appreciated that although the figures depict four shell tabs 20a, 20b, 20c and 20d and four sealing flanges 22a, 22b, 22c and 22d, other configurations are also possible. For example, the present invention torque converter blade 12 can include at least two shell tabs and at least one flexible sealing flange, and such variations are within the spirit and scope of the claimed invention. Outer edge 18 is arranged to conform to inner surface 24 of torque converter shell 10. Torque converter shell 10 comprises at least two slots arranged therethrough, e.g., slots 26a, 26b, 26c and 26d. It should be appreciated that although four slots are shown arranged through torque converter shell 10, the present invention merely requires at least two slots, or in other words the torque converter shell must have a complimentary slot for each shell tab included on the present invention torque converter blade. The flexible sealing flanges, e.g., sealing flanges 22a, 22b, 22c and 22d, are arranged to conform to inner surface 24 of torque converter shell 10 to provide a fluid seal. Shell tabs 20a, 20b, 20c and 20d are disposed through slots 26a, 26b, 26c and 26d, respectively, and at least one of the shell tabs is arranged to engage outer surface 28 of torque converter shell 10. In other words, present invention torque converter blade 12 may be secured within torque converter shell 10 with a single shell tab; however, an additional shell tab is necessary to maintain the alignment of torque converter blade 12 within torque converter shell 10, especially when hydraulic forces are applied to torque converter blades 12 during torque loading operations. It should be appreciated that "conform to a surface" is intended to mean the shape of the outer edge of the torque converter blade and/or the shape of the sealing flange substantially complimentary engages the shape of the inner surface of the torque converter shell.

As described supra, flexible sealing flanges 22a, 22b, 22c and 22d are integral to body 16 via outer edge 18. The sealing flanges are made flexible through coining and are formed such that the flanges are at a small angle, e.g., angle 30, relative to torque converter shell 10, prior to tab rolling. (See FIG. 7A). It should be appreciated that coining increases the flexibility of the sealing flanges by decreasing the material thickness of the flanges relative to the other portions of the blade, e.g., the tabs. As shown in FIG. 6A, shell tab 20b has a thickness, i.e., thickness 31. Thickness 31 is substantially the same thickness as the thickness of body 16 since neither the shell tabs nor the body is coined. Contrarily, flexible sealing flange 22b (See FIGS. 6B and 6C) includes coined portion 13 having a thickness, i.e., thickness 32, which is less than the thickness of body 16, due to the coining operation. Thus, it necessarily follows that thickness 31 (thickness of shell tab) is greater than thickness 31 (thickness of coined portion of flexible sealing flange). By forming coined portion 13, the flexible sealing flanges are permitted to bend. It should be appreciated that although only coined portion 13 is shown to be thinner than body 16, the entire flexible sealing flange may also be thinner than body 16, i.e., the entire flange is coined, and such variations are within the spirit and scope of the claimed invention.

Furthermore, in order to facilitate the assembly of a torque converter including torque converter shell 10, each of the flexible sealing flanges is elevated relative to shell tabs 20a, 20b, 20c and 20d, prior to assembly. In other words, sealing flanges 22a, 22b, 22c and 22d are angularly displaced relative to shell tabs 20, for example, displaced by angle 33, thereby making insertion of blades 12 within shell 10 easier to perform. (See FIGS. 5 and 9). In a preferred embodiment, angle 33 is about ninety degrees (90°); however, it should be appreciated that other angles are also possible, e.g., greater than or less than ninety degrees (90°), and such variations are within the spirit and scope of the claimed invention.

In some embodiments, flexible sealing flanges 22a, 22b, 22c and 22d are disposed between shell tabs 20a, 20b, 20c and 20d, i.e., as shown in the figures. However, it should be appreciated that the sealing flanges may also be disposed adjacent to the shell tabs, i.e., not between the tabs, and may be both adjacent to and between the shell tabs, separately and concurrently. In other words, a sealing flange may be disposed between the shell tabs, e.g., sealing flange 22b is between shell tabs 20b and 20c, a sealing flange may be disposed adjacent to shell tabs, e.g., sealing flange 22a is adjacent to shell tabs 20b and 20c, a sealing flange may be both adjacent to and between the shell tabs, e.g., sealing flange 22a is adjacent to shell tabs 20b and 20c and sealing flange 22a is between shell tabs 20a and 20b. Such variations are within the spirit and scope of the claimed invention.

Each of the slots, e.g., slots 26a, 26b, 26c and 26d, has a depth, e.g., depth 34, and at least one of shell tabs has a length, e.g., length 36, wherein length 36 is greater than depth 34. (See FIGS. 7A and 7B). Thus, during assembly, at least one of the shell tabs may be bent such that the shell tab engages outer surface 28 thereby retaining torque converter blade 12 within torque converter shell 10.

In some embodiments, body 16 further comprises inner edge 38 have at least one core tab 40 arranged to engage core ring 14. Additionally, it should be appreciated that torque converter shell 10 may be a turbine shell in a variety of torque converter types, e.g., turbine shell 42, or alternatively, torque converter shell 10 may be an impeller shell (e.g., impeller shell 44) in torque converters having internally positioned impellers, e.g., multi-function torque converters.

The present invention also broadly comprises torque converter 15. Torque converter 15 comprises shell 10 having inner and outer surfaces 24 and 28, respectively, and at least two slots arranged therethrough, e.g., slots 26a, 26b, 26c and 26d. Torque converter 15 further comprises torque converter blade 12. Torque converter blade 12 comprises body 16 having outer edge 18 arranged to conform to inner surface 24 of torque converter shell 10, at least two shell tabs, e.g., tabs 20a, 20b, 20c and 20d, integral to outer edge 18 and extending therefrom, and at least one flexible sealing flange, e.g., sealing flanges 22a, 22b, 22c and 22d, adjacent to at least one of the shell tabs. Sealing flanges 22a, 22b, 22c and 22d are integral to outer edge 18 and extend therefrom, and are arranged to conform to inner surface 24 of torque converter shell 10 to provide a fluid seal. Similar to the embodiments described above, at least two shell tabs, e.g., tabs 20a, 20b, 20c and 20d, are disposed through at least two slots, e.g., 26a, 26b, 26c and 26d, and at least one of the at least two shell tabs is arranged to engage outer surface 28 of shell 10.

In a further embodiment of the present invention, torque converter 15 comprises shell 10 having inner and outer surfaces, 24 and 28, respectively, and at least two slots arranged therethrough, e.g., slots 26a, 26b, 26c and 26d. This embodiment of torque converter 15 further comprises torque converter blade 12. Torque converter blade 12 comprises body 16 having outer edge 18, at least two shell tabs, e.g., tabs 20a, 20b, 20c and 20d, integral to outer edge 18 and extending therefrom, and at least one flexible sealing flange, e.g., sealing flanges 22a, 22b, 22c and 22d, adjacent to at least one of the at least two shell tabs. The at least one flexible sealing flange is integral to outer edge 18 and extending therefrom. Outer edge 18 and the at least one flexible sealing flange are arranged to conform to inner surface 24 of torque converter shell 10. Moreover, this embodiment comprises fluid seal 46 including at least one interface between inner surface 24 of shell 10 and the at least one flexible sealing flange, e.g., interface 48. Again, similar to the embodiments described above, at least two shell tabs, e.g., tabs 20a, 20b, 20c and 20d, are disposed through at least two slots, e.g., 26a, 26b, 26c and 26d, and at least one of the at least two shell tabs is arranged to engage outer surface 28 of shell 10.

It should be appreciated that in view of the foregoing, the present invention also broadly comprises a method of assembling a blade in a torque converter shell. In an embodiment of the present invention method, shell 10 comprises inner and outer surfaces 24 and 28, respectively, and at least two slots arranged therethrough, e.g., slots 26a, 26b, 26c and 26d. Blade 12 comprises body 16 having outer edge 18 arranged to conform to inner surface 24 of shell 10, at least two shell tabs, e.g., tabs 20a, 20b, 20c and 20d, integral to outer edge 18 and extending therefrom and at least one flexible sealing flange, e.g., sealing flanges 22a, 22b, 22c and 22d, adjacent to at least one of said at least two shell tabs. In this embodiment of the present invention method, the at least one flexible sealing flange is integral to outer edge 18 and extending therefrom, and the at least one flexible sealing flange is arranged to conform to inner surface 24 of shell 10. The present invention method comprises the steps of: a) inserting the at least two tabs through the at least two slots; b) bending at least one of the at least two tabs to engage outer surface 28, for example, with a roll press; and, c) retaining the at least one flexible sealing flange against inner surface 24 of shell 10 via the at least one bent tab. In some embodiments, the present invention method further comprises the step of: d) providing fluid seal 46 between the at least one flexible sealing flange and inner surface 24 of shell 10, i.e., interface 48.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A blade for a torque converter comprising:
    an outer edge;
    a body comprising a portion of the outer edge;
        at least two shell tabs integral to said outer edge and extending away from the body at the portion of the outer edge; and,
        at least one flexible sealing flange, separate from the body, adjacent to at least one of said at least two shell tabs, wherein said at least one flexible sealing flange is integral to said outer edge, extends from the portion of the outer edge, and is connected to the body only at the portion of the outer edge, said outer edge is arranged to conform to an inner surface of a shell in said torque converter, said shell comprising at least two slots arranged therethrough, said at least one flexible sealing flange is arranged to conform to said inner surface of said shell to provide a fluid seal, each shell tab from said at least two shell tabs is disposed through a respective slot from said at least two slots, at least one of said at least two shell tabs is arranged to engage an outer surface of said shell, said at least one flexible sealing flange comprises a first thickness, and each of said at least two shell tabs comprises a second thickness greater than said first thickness.

2. The blade of claim 1 wherein said at least one flexible sealing flange is elevated relative to said at least two shell tabs.

3. The blade of claim 1 wherein said at least one flexible sealing flange is disposed between said at least two shell tabs.

4. The blade of claim 1 wherein each of said at least two slots has a depth and at least one of said at least two shell tabs has a length greater than said depth of at least one of said at least two slots.

5. The blade of claim 1 wherein said body further comprises an inner edge having at least one core tab arranged to engage a core ring.

6. The blade of claim 1 wherein said shell is a turbine shell or a pump shell.

7. A torque converter comprising:
    a shell comprising inner and outer surfaces and at least two slots arranged therethrough; and,
    a blade comprising:
        an outer edge arranged to conform to said inner surface of said shell;
        a body including a portion of the outer edge;
        at least two shell tabs integral to said outer edge and extending from the portion of the outer edge; and
        at least one flexible sealing flange adjacent to at least one of said at least two shell tabs, said at least one flexible sealing flange integral to said outer edge and extending from the portion of the outer edge, wherein:
            said at least one flexible sealing flange includes a surface extending from the body, and arranged to conform to said inner surface of said shell to provide a fluid seal;
            each shell tab from said at least two shell tabs is disposed through a respective slot from said at least two slots;
            at least one of said at least two shell tabs is arranged to engage said outer surface of said shell;
            said at least one flexible sealing flange comprises a first thickness; and
            each of said at least two shell tabs comprises a second thickness greater than said first thickness.

8. The blade of claim 7 wherein said at least one flexible sealing flange is elevated relative to said at least two shell tabs.

9. The blade of claim 7 wherein said at least one flexible sealing flange is disposed between said at least two shell tabs.

10. The blade of claim 7 wherein each of said at least two slots has a depth and at least one of said at least two shell tabs has a length greater than said depth of at least one of said at least two slots.

11. The blade of claim 7 wherein said body further comprises an inner edge having at least one core tab arranged to engage a core ring.

12. The blade of claim 7 wherein said shell is a turbine shell or a pump shell.

13. A torque converter comprising:
    a shell comprising inner and outer surfaces and a plurality of slots arranged therethrough;
    a blade comprising:
        a body having an outer edge ;
        a plurality of shell tabs integral to said outer edge and extending therefrom;
        a plurality of flexible sealing flanges, each flexible sealing flange adjacent to respective shell tabs from the plurality of shell tabs, said plurality of flexible sealing flange integral to said outer edge and extending away from the outer edge and the body therefrom; and,
        a plurality of gaps along the outer edge between respective adjacent tab shells and flexible sealing flanges, wherein said outer edge and said at least one flexible sealing flange are arranged to conform to said inner surface of said shell; and,
    a fluid seal comprising at least one interface between said inner surface of said shell and said plurality of flexible sealing flanges, wherein each shell tab from said at least two shell tabs is disposed through a respective slot from said at least two slots and at least one of said at least two shell tabs is arranged to engage said outer surface of said shell.

14. The blade of claim 13 wherein said at least one flexible sealing flange is elevated relative to said at least two shell tabs.

15. The blade of claim 13 wherein said at least one flexible sealing flange is disposed between said at least two shell tabs.

16. The blade of claim 13 wherein said at least one flexible sealing flange comprises a first thickness and each of said at least two shell tabs comprises a second thickness greater than said first thickness.

17. The blade of claim 13 wherein each of said at least two slots has a depth and at least one of said at least two shell tabs has a length greater than said depth of at least one of said at least two slots.

18. The blade of claim 13 wherein said body further comprises an inner edge having at least one core tab arranged to engage a core ring.

19. The blade of claim 13 wherein said shell is a turbine shell or a pump shell.

20. A method of assembling a blade in a torque converter shell, said shell comprising inner and outer surfaces and at least two slots arranged therethrough; and, said blade comprising an outer edge arranged to conform to said inner surface of said shell, a body including a portion of the outer edge, at least two shell tabs integral to said outer edge and extending from the portion of the outer edge and at least one flexible sealing flange, separate from the body, adjacent to at least one of said at least two shell tabs, said at least one flexible sealing flange is integral to said outer edge and extending from the portion of the outer edge, wherein said at least one flexible sealing flange is arranged to conform to said inner surface of said shell, said method comprising the steps of:
   a) inserting each tab from said at least two tabs through a respective slot from said at least two slots;
   b) bending at least one of said at least two tabs to engage said outer surface; and,
   c) retaining said at least one flexible sealing flange against said inner surface of said shell at a portion of the at least one flexible sealing flange separate from the outer edge, wherein:
      said at least one flexible sealing flange comprises a first thickness; and
      each of said at least two shell tabs comprises a second thickness greater than said first thickness.

21. The method of assembling a blade in a torque converter of claim 20 further comprising the step of:
   d) providing a fluid seal between said at least one flexible sealing flange and said inner surface of said shell.

22. The method of assembling a blade in a torque converter of claim 20, wherein said at least one flexible sealing flange is elevated relative to said at least two shell tabs.

23. The method of assembling a blade in a torque converter of claim 20, wherein said at least one flexible sealing flange is disposed between said at least two shell tabs.

24. The method of assembling a blade in a torque converter of claim 20, wherein each of said at least two slots has a depth and at least one of said at least two shell tabs has a length greater than said depth of at least one of said at least two slots.

25. The method of assembling a blade in a torque converter of claim 20, wherein said body further comprises an inner edge having at least one core tab arranged to engage a core ring.

26. The method of assembling a blade in a torque converter of claim 20, wherein said shell is a turbine shell or a pump shell.

\* \* \* \* \*